United States Patent [19]
Tanaka et al.

[11] Patent Number: 5,241,230
[45] Date of Patent: Aug. 31, 1993

[54] COOLING FAN WITH REDUCED NOISE CAPABILITY IN AN AC GENERATOR

[75] Inventors: Toshinori Tanaka; Yutaka Kitamura; Hiroyuki Yano; Kazuo Matsunaga, all of Himeji, Japan

[73] Assignee: Mitsubishi Denki K.K., Tokyo, Japan

[21] Appl. No.: 961,866

[22] Filed: Oct. 15, 1992

[30] Foreign Application Priority Data

Oct. 15, 1991 [JP] Japan ................. 3-296257
Dec. 24, 1991 [JP] Japan ................. 3-340932
Apr. 23, 1992 [JP] Japan ................. 4-104255

[51] Int. Cl.⁵ .................... H02K 9/06; B63H 1/26
[52] U.S. Cl. ................... 310/62; 416/223 R; 29/889.7
[58] Field of Search ............. 310/62, 58, 59, 64, 310/262, 263, 63; 416/223 R, 224; 29/889.4, 889.6, 889.7, 889.71, 889.72

[56] References Cited

U.S. PATENT DOCUMENTS

| | | | |
|---|---|---|---|
| 4,418,295 | 11/1983 | Shiga | 310/59 |
| 4,488,070 | 12/1984 | Iwagi et al. | 310/62 |
| 5,021,696 | 6/1991 | Nelson | 310/62 |
| 5,028,826 | 7/1991 | Kitamura | 310/51 |
| 5,095,235 | 3/1992 | Kitamura | 310/62 X |
| 5,144,175 | 9/1992 | Graggs | 310/62 X |

Primary Examiner—Steven L. Stephan
Assistant Examiner—E. To
Attorney, Agent, or Firm—Sughrue, Mion, Zinn, Macpeak & Seas

[57] ABSTRACT

A vehicular AC generator comprising a stator supported by a front bracket and a rear bracket; a rotor fixed to a rotating shaft supported by the front bracket and the rear bracket through bearings, provided with magnetic pole cores wherein a plurality of pairs of magnetic poles are formed in the circumferential direction, retaining an excitation coil; a pair of fans provided at a front end and a rear end of the magnetic pole cores; a plurality of inlet openings provided at end faces of the front bracket and the rear bracket; a plurality of outlet openings provided at peripheral portions of the front bracket and the rear bracket; and fans for cooling inside of the vehicular AC generator by circulating air therein by rotation of the rotor; wherein the fans each is fixed with a side plate at ends of blades thereof and at least in a front side fan of the both fans, a difference between an inner radius of the side plate and an inner radius of the inlet opening of the corresponding front bracket is larger than a width of the blade and the inner radius of the side plate is smaller than an outer radius of the inlet opening.

7 Claims, 10 Drawing Sheets

COOLING FAN WITH REDUCED NOISE CAPABILITY IN AN AC GENERATOR

BACKGROUND OF THE INVENTION

Field of the Invention

This invention relates to a vehicular AC generator having a salient-pole-rotating rotor which is supported by brackets, and particularly to improvements of fans attached to both ends of a magnetic pole core, and more particularly to reduction of wind sound of the fans.

This invention relates to a cooling fan for circulating air in a vehicular AC generator and a method of making thereof, and particularly to improvements of a so-called axial-flow type cooling fan for circulating air in the vehicular AC generator.

Discussion of Background

FIG. 5 is a longitudinal sectional diagram of a conventional vehicular AC generator. In FIG. 5, a reference numeral 1 designates a stator which is composed of a stator core 2 and a stator coil 3. A numeral 4 designates a rotor composed as follows. Numerals 5 and 6 designate magnetic pole cores having different polarities wherein magnetic pole teeth 5a and 6a are protruded alternatingly in the circumferential direction. A numeral 7 designates an excitation coil retained between the magnetic pole cores 5 and 6, 8, a rotating shaft fixed to the magnetic pole cores 5 and 6, 9, a pair of slip rings fixed to the rotating shaft 8 through insulating sleeves, and 10 and 11, fans fixed to the magnetic pole cores 5 and 6.

Numerals 12 and 13 designate a front bracket and a rear bracket which support the stator core 2 by a tie bolt 14. The front bracket 12 is provided with a plurality of inlet openings 12a at the end portion thereof and a plurality of outlet openings 12b at the peripheral portion thereof, for circulating air. The rear bracket 13 is provided with a plurality of inlet openings 13a at the end portion thereof and a plurality of outlet openings 13b at the peripheral portion thereof, for circulating air. The rotating shaft 8 is supported by the front bracket 12 and the rear bracket 13 through bearings 15 and 16. A numeral 17 designates a pulley fixed to the rotating shaft 8. The rotation of an engine is transmitted through a belt to the pulley 17 thereby rotating the rotor 4.

A numeral 18 designates a rectifier for rectifying an AC voltage induced in the stator coil 3 into a DC voltage and for outputting it, and 19, a voltage regulator which detects an output voltage of the rectifier, and controls an excitation current thereby regulating a terminal voltage to a predetermined value. A numeral 20 designates a brush retainer which press-contacts a retained brush 21 to the slip ring 9 thereby conducting the excitation current.

In this vehicular AC generator, when the rotor 4 is rotated, the AC voltage is induced in the stator coil 3 supplying power and the generator is heated. The stator 1 and the rotor 4 are cooled by the air-circulation by rotating the fans 10 and 11.

The cooling air by rotating the fan 10 is sucked from the inlet openings 12a of the front bracket 12, cools the stator 1 and is exhausted from the outlet openings 12b as shown by an arrow mark A. The cooling air by rotating the fan 11 is sucked from the inlet openings 13a of the rear bracket 13, cools the rectifier 18, the voltage regulator 19, an electric collector and the stator 1, and exhausted from the outlet openings 13b, as shown by an arrow mark B.

In the conventional vehicular AC generator, there are irregularities on the faces of the front bracket 12 and the rear bracket 13 that blades 10a of the fan 10 and blades 11a of the fan 11 oppose, which causes to enhance a wind sound and accordingly, a noise.

SUMMARY OF THE INVENTION

It is an object of the present invention to provide a vehicular AC generator wherein the wind sound of the fan is reduced.

It is an object of the present invention to provide a cooling fan for circulating air in a vehicular AC generator wherein the wind sound of the fan is reduced, and a method of making the cooling fan for circulating air with high productivity.

According to a first aspect of the present invention, there is provided a vehicular AC generator comprising:

a stator supported by a front bracket and a rear bracket;

a rotor fixed to a rotating shaft supported by the front bracket and the rear bracket through bearings, provided with magnetic pole cores wherein a plurality of pairs of magnetic poles are formed in the circumferential direction, retaining an excitation coil;

a pair of fans provided at a front end and a rear end of the magnetic pole cores;

a plurality of inlet openings provided at end faces of the front bracket and the rear bracket;

a plurality of outlet openings provided at peripheral portions of the front bracket and the rear bracket; and fans for cooling inside of the vehicular AC generator by circulating air therein by rotation of the rotor; wherein the fans each is fixed with a side plate at ends of blades thereof and at least in a front side fan of the both fans, a difference between an inner radius of the side plate and an inner radius of the inlet opening of the corresponding front bracket is larger than a width of the blade and the inner radius of the side plate is smaller than an outer radius of the inlet opening.

According to a second aspect of the present invention, there is provided a vehicular AC generator comprising:

a stator supported by a front bracket and a rear bracket;

a rotor fixed to a rotating shaft supported by the front bracket and the rear bracket through bearings, provided with magnetic pole cores wherein a plurality of pairs of magnetic poles are formed in the circumferential direction, retaining an excitation coil;

a pair of fans provided at a front end and a rear end of the magnetic pole cores;

a plurality of inlet openings provided at end faces of the front bracket and the rear bracket;

a plurality of outlet openings provided at peripheral portions of the front bracket and the rear bracket; and fans for cooling inside of the vehicular AC generator by circulating air therein by rotation of the rotor; wherein protrusions for welding are provided at either one of end portions of blades of the respective fan and a side plate attached thereto and the side plate is fixed to the end portions of the blades of the respective fan.

According to a third aspect of the present invention, there is provided a vehicular AC generator comprising:

a stator supported by a front bracket and a rear bracket;

a rotor fixed to a rotating shaft supported by the front bracket and the rear bracket through bearings, provided with magnetic pole cores wherein a plurality of pairs of magnetic poles are formed in the circumferential direction, retaining an excitation coil;

a front fan and a rear fan provided at a front end and a rear end of the magnetic pole cores;

a plurality of inlet openings provided at end faces of the front bracket and the rear bracket;

a plurality of outlet openings provided at peripheral portions of the front bracket and the rear bracket; and fans for cooling inside of the vehicular AC generator by circulating air therein by rotation of the rotor; wherein ring-like side plates are fixed to outer edge portions of blades of the front fan and the rear fan by a projection welding.

According to a fourth aspect of the present invention, there is provided a cooling fan for circulating air in a vehicular AC generator which rotates with a rotor arranged in brackets, sucks air from inlet openings formed in the brackets and exhausts air from outlet openings formed in the brackets thereby cooling inside of the vehicular AC generator comprising:

a plurality of blades arranged in the circumferential direction of the cooling fan standing on the periphery of a plate in a direction orthogonal to a surface of the plate; and a ring-like side plate arranged at first ends of the blades opposite to second ends of the blades which are attached to the disk and fixed to the first ends of the blades arranged in the circumferential direction of the cooling fan.

According to a fifth aspect of the present invention, there is provided a method of making a cooling fan for circulating air in a vehicular AC generator which rotates with a rotor arranged in brackets, sucks air from inlet openings formed in the brackets and exhausts air from outlet openings formed in the brackets thereby cooling inside of the vehicular AC generator comprising the steps of:

either forming protrusions for welding on first edges of a plurality of blades supported by a plate and arranged in the peripheral direction of the plate opposite to second edges thereof on the side of the plate, or forming a circular protrusion on a ring-like side plate to be arranged and fixed to the first edges thereof;

placing a main body of the cooling fan composed of the plate supporting the plurality of blades on a first electrode;

placing the side plate on the first edges of the plurality of blades of the main body;

placing a second electrode on the side plate; and flowing current between the first and the second electrodes and pressing the main body of the cooling fan and the side plate thereby welding the side plate to the first edges of the plurality of blades by a projection welding.

DETAILED DESCRIPTION OF THE PREFERRED EMBODIMENTS

Example 1

Figure 1:
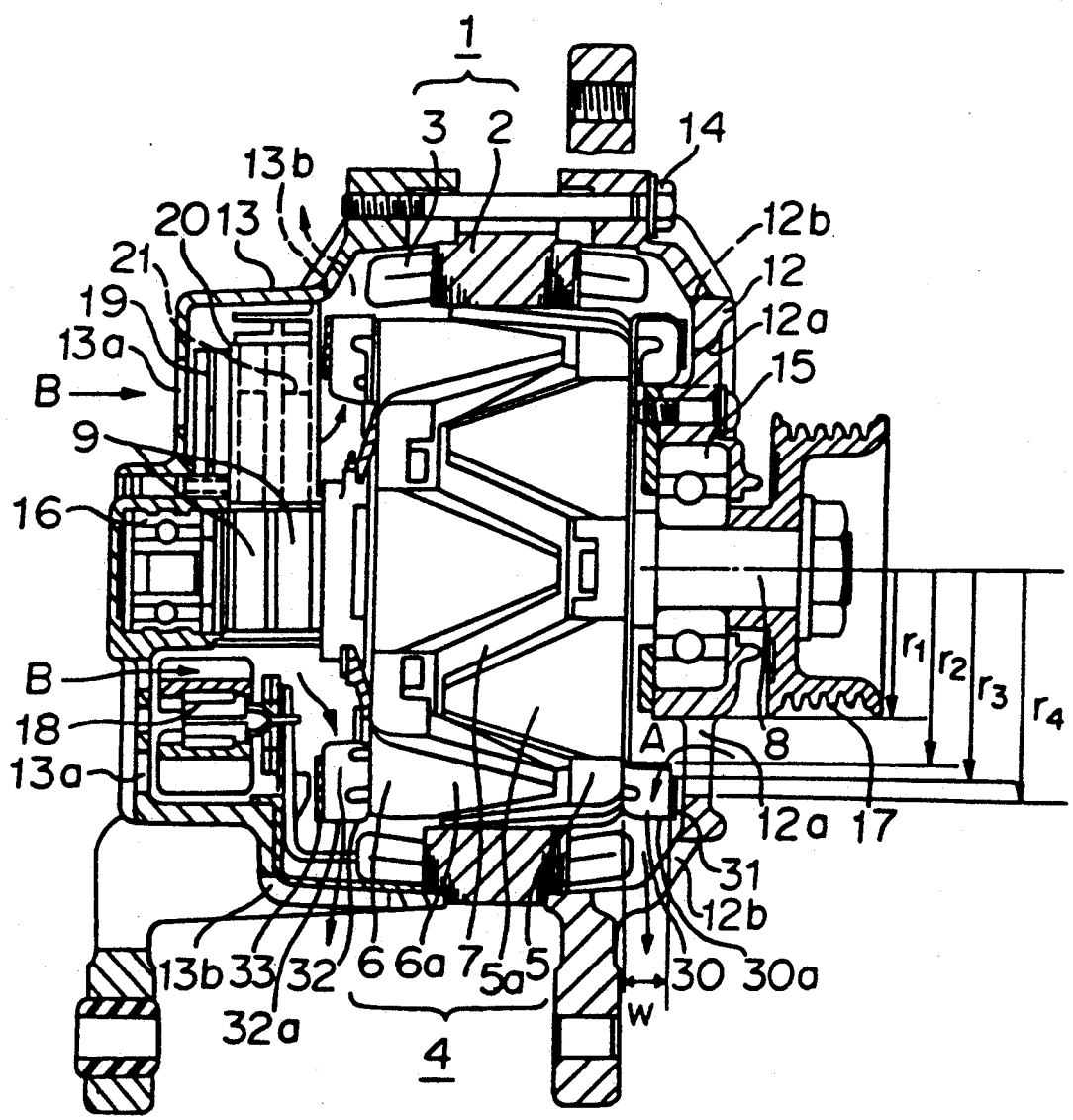
FIG. 1 is a longitudinal sectional diagram of embodiment 1 of a vehicular AC generator according to the present invention.
Figure 5:
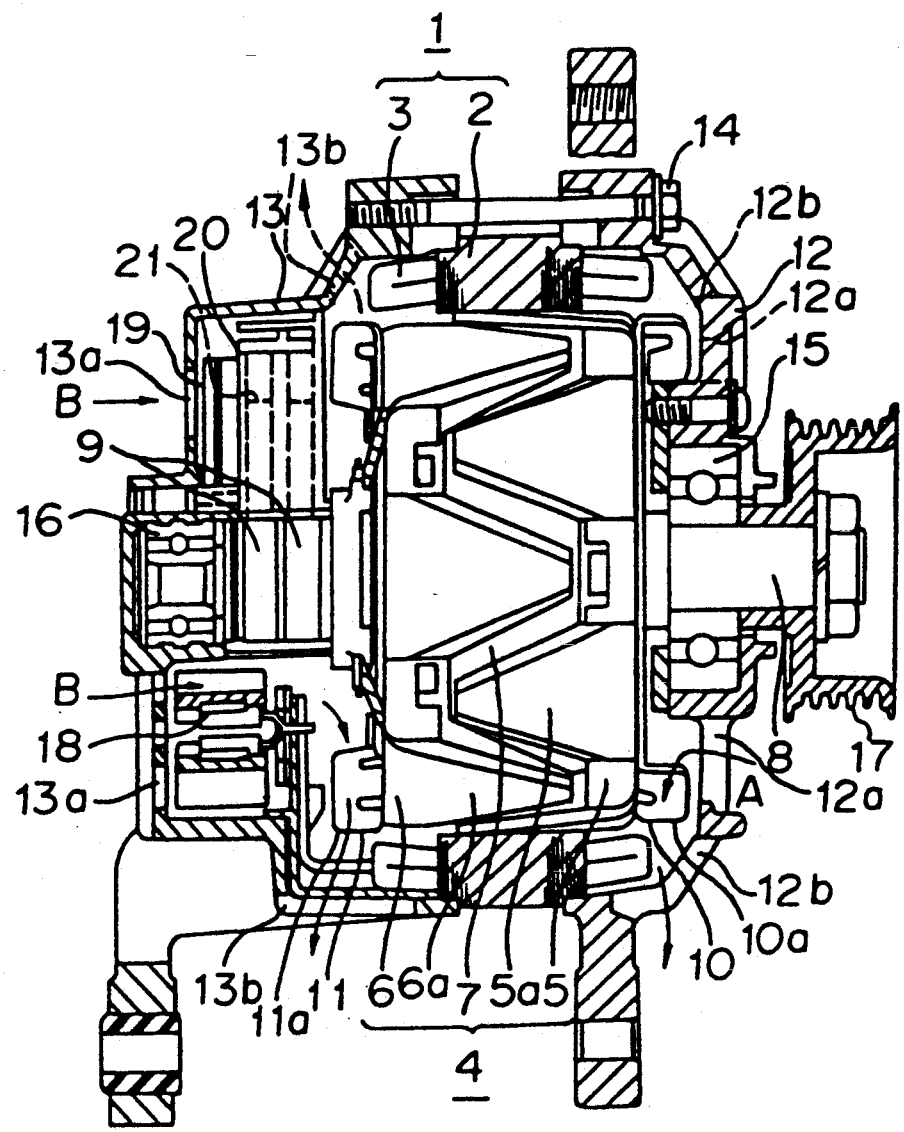
FIG. 5 is a longitudinal sectional diagram of a conventional vehicular AC generator.

FIG. 1 is a longitudinal sectional diagram of a vehicular AC generator according to the present invention, wherein notations 1 through 9, 12 through 21, 5a, 6a, 12a, 12b, 13a and 13b are the same with those in FIG. 5. A reference numeral 30 designates a front fan which is fixed to an end portion of the magnetic pole core 5. A side plate 31 is fixed to an end portion of blades 30a. A numeral 32 designates a rear fan which is fixed to the other portion of the magnetic pole core 6. A side plate 33 is fixed to end portions of blades 32a.

Figure 2A:
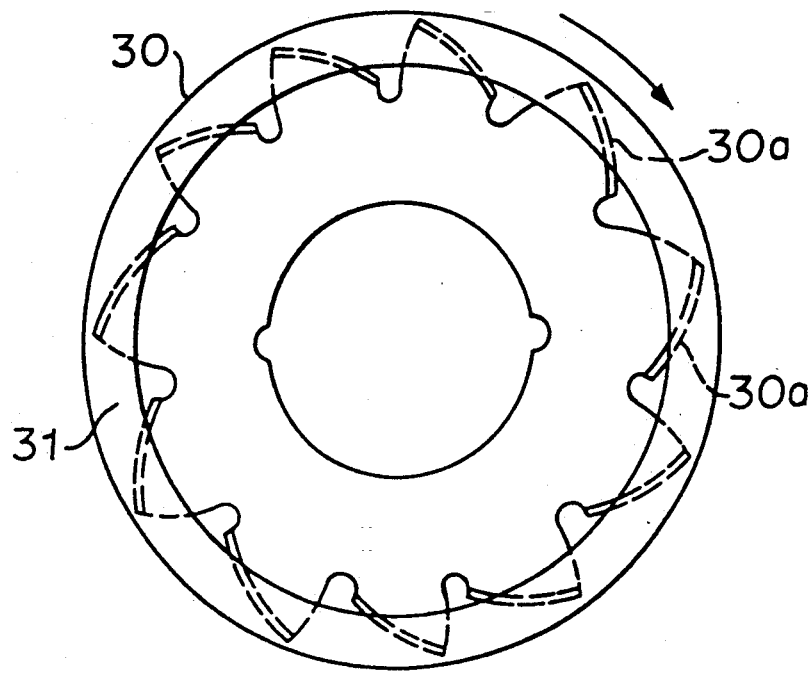
FIGS. 2(A) and 2(B) are front views of a front fan and a rear fan of FIG. 1.
Figure 2B:
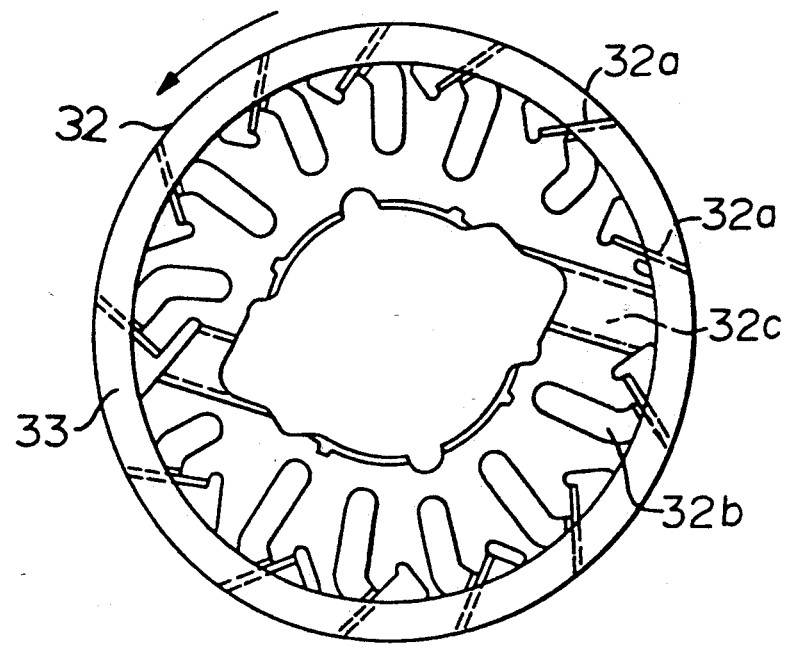

FIGS. 2(A) and 2(B) are front views of the front fan 30 and the rear fan 32. In FIG. 2(A), the side plate 31 is fixed to end portions of the blades 30a, which are formed by bending, of the fan 30 by a projection welding or the like. In FIG. 2(B), the side plate 33 is fixed to end portions of blade 32a, which are formed by bending, of the fan 32 by a projection welding or the like. A notation 32b designates a reinforcement rib which is formed by pressing and 32c, a protrusion for passing connecting wires of the excitation coil 7 on a backside face thereof. By the way, reinforcement ribs are also formed in the fan 30 by pressing. However, the illustration is omitted.

In FIG. 1, respective positional relationships among the front fan 30 and the inlet openings 12a of the bracket 12 are as follows. Assuming $r_1$ as an inner radius of the inlet opening, $r_2$ as an inner radius of the fan, $r_3$ as an inner radius of the side plate, $r_4$ as an outer radius of the inlet opening, and w as a width of blade, $r_3 - r_1 \geq w$, $r_3 < r_4$ and $r_1 < r_2 \leq r_3 < r_4$. In this way, the reduction of the wind quantity is avoided by equalizing a difference between the inner radius of the side plate 31 and the inner radius of the inlet opening 12a with the width of the blade 30a, and the wind quantity is increased by making the difference larger than the width. This is because the suction of air from the inlet openings 12a to the blades 30a, becomes smooth and the suction quantity is increased. The outer radius of the inlet opening 12a is set to be larger than the inner radius of the side plate 31. Since the outer radius of the inlet opening 12a is large, the suction quantity is increased and the wind quantity is increased. When $r_3 = r_4$, the effect of the reduction of the wind sound is small. When $r_3 < r_4$, the order dispersion effect of the wind sound is increased.

The order dispersion effect signifies that a high noise level in a comparatively narrow frequency range of a noise is converted and dispersed into that in a wider frequency range and a total noise level of a noise which is synthesized by respective frequency components, is lowered, in this case, by $r_3 < r_4$.

In case of a three-phase AC generator wherein the diameter of the stator core 2 is 135 mm of which pole number is 16, a number of blades of the front fan 30 is 11, the inner radius of the side plate 31 is 84 mm, a number of blades of the rear fan 32 is 13 and the inner radius of the side plate 33 is 81 mm, as a result of actual measurement, the wind quantity is 1.3 times as large as that in case of without the side plate. Furthermore, the wind sound is reduced by about 3 dB at a fan speed of 12000 to 18000 rpm.

Example 2

Figure 3A:
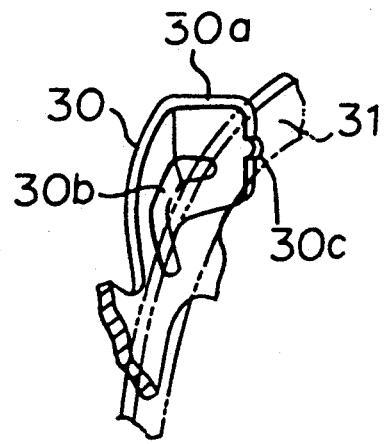
FIGS. 3(A) and 3(B) are perspective views showing examples wherein protrusions for welding are provided at blades of a front fan of embodiment 2 of this invention.

The fixing of the side plate 31 to end portions of the blades 30a of the front fan 30 is performed as shown in FIG. 3(A). A projection for welding 30c is provided by pressing on the edge portion of the respective blade 30a of the fan 30 for performing a projection welding. The side plate 31 is fixed to the end portions of the respective blades 30a by a projection welding.

Figure 3B:
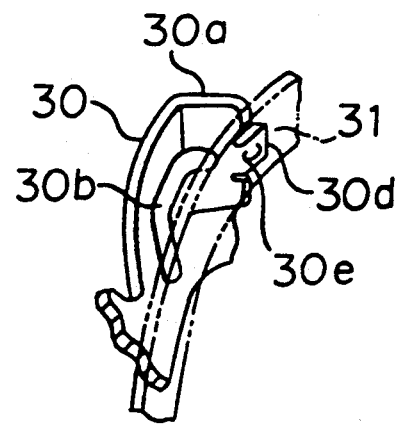

Furthermore, as shown in FIG. 3(B), a tab for welding 30d is formed on the edge portion of each blade 30a by bending the tab in the circumferential direction. A projection for welding 30e is provided on the tab for welding 30d by pressing. The side plate 31 is fixed to the end portions of the respective blades 30a by a projection welding.

Example 3

Figure 4A:
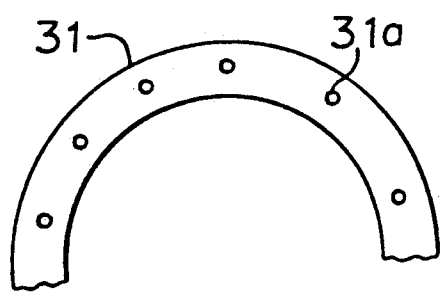
FIGS. 4(A) and 4(B) are a front view and a sectional view of a side plate which is welded to the blades of the front fan of embodiment 3 of this invention.
Figure 4B:
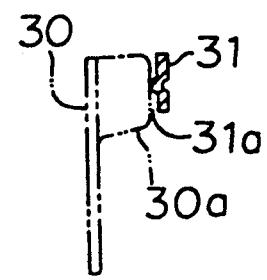

In the above examples in FIGS. 3(A) and 3(B), the protrusions for welding 30c or 30e are provided on the blades 30a. However, projections for welding 31a may be provided by pressing on the side plate 31, at welding positions corresponding to the blades 30a as shown in FIGS. 4(A) and 4(B). The side plate 31 is fixed to the respective blades 30a of the fan 30 by a projection welding. In this way, the side plate 31 is fixed to the fan 30 with high productivity. Furthermore, similar to the fan 30, the fan 32 is fixed with the side plate 33 by welding the side plate 33 to the blades 32a by a projection welding.

As state above, according to the first aspect of the present invention, the side plate is fixed to the end portions of the blades of the fan, the difference between the inner radius of the side plate and the inner radius of the inlet opening of the bracket, is set to be larger than the width of the blade and the inner radius of the side plate is set to be smaller than the outer radius of the inlet opening. Accordingly, the wind quantity is increased and the noise due to the wind sound is reduced. Furthermore, according to the second aspect of the present invention, the side plate is fixed to the end portions of the blades of the fan with high productivity.

Example 4

Figure 6:
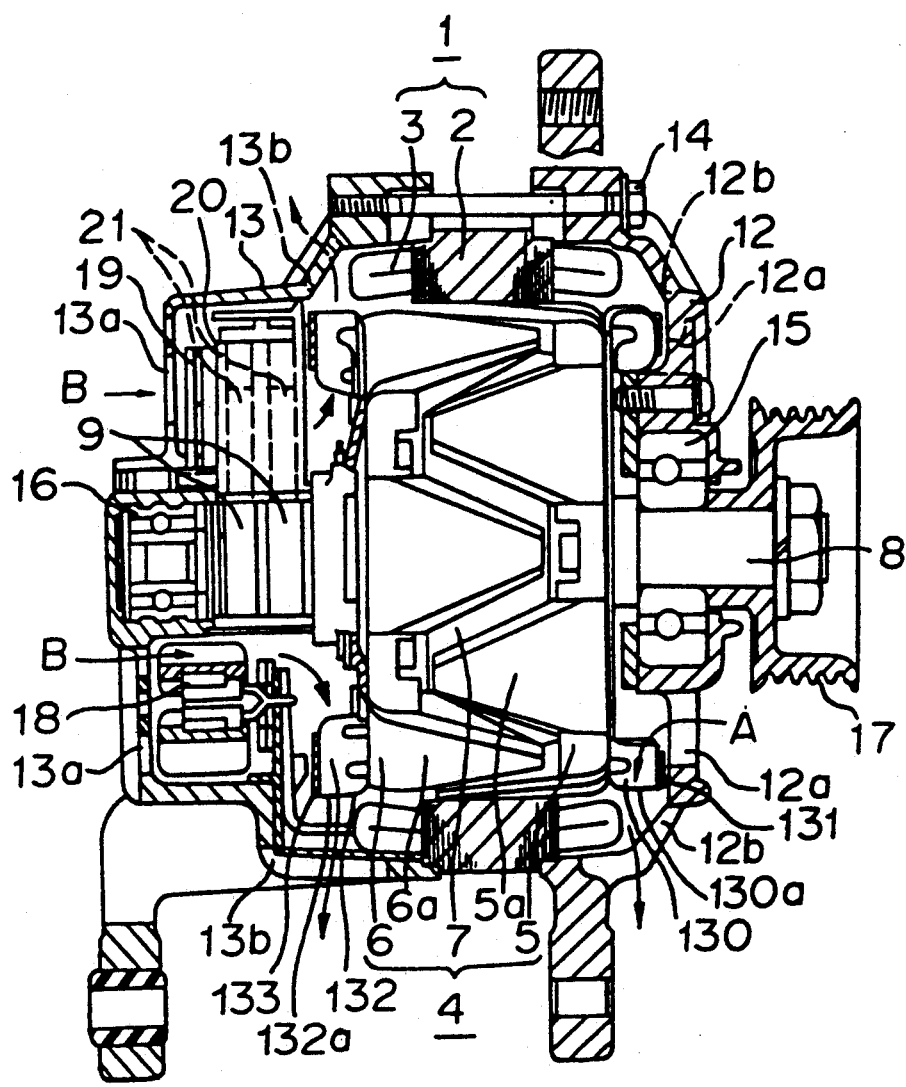
FIG. 6 is a longitudinal sectional diagram of an embodiment of a vehicular AC generator according to the present invention.

Explanation will be given to embodiment 4 of this invention referring to the drawings. FIG. 6 is a longitudinal sectional diagram of a vehicular AC generator of this invention, wherein the same portion with that in FIG. 5 is attached with the same notation and a duplicated explanation will be omitted. A reference numeral 130 designates a front fan fixed to an end portion of the magnetic pole core 5, the end portions of respective blades 130a of which are fixed with a ring-like side plate 131 by welding. A numeral 132 designates a rear fan fixed to the other end portions of the magnetic pole core 6, the outer end portions of respective blades 132a of which are similarly fixed with a side plate 133 by welding.

Figure 7:
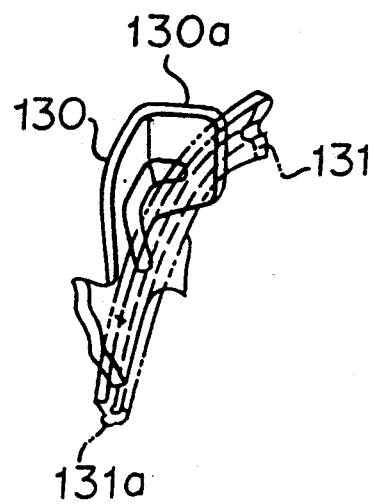
FIG. 7 is a perspective view showing an embodiment of the present invention wherein a protrusion for welding is provided at a side plate to be welded to blades of a front fan.

The fixing of the side plate 131 to the outer end portions of the blades 130a of the front fan 130, is performed as shown in FIG. 7. A projection for welding 131a for performing a projection welding is attached to a ring-like side plate 131. The side plate 131 is fixed to the outer end portions of the respective blades 130a by a projection welding utilizing the protrusion for welding 131a.

Figure 8A:
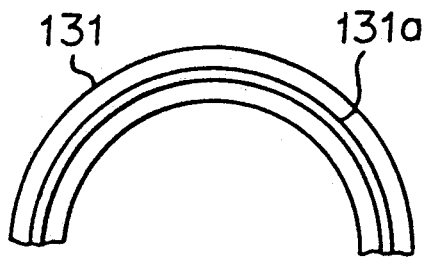
FIGS. 8(A) and 8(B) are a partial front view and a sectional diagram of an embodiment of a side plate to be welded to the blades of the front fan.
Figure 8B:
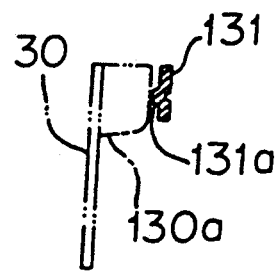

FIGS. 8(A) and 8(B) are a plan view and a side sectional view of a portion of the side plate 131. In details, a circular projection for welding 131a is provided on the side plate 131 by pressing. The productivity can be promoted by welding the side plate 131 to the front fan 130 in this way. Furthermore, similar to the front fan 130, the rear fan 132 is fixed with the side plate 133 by welding the side plate 133 to the blades 132a by a projection welding.

As state above, according to the present invention, the ring-like side plates are fixed to the outer end portions of the front fan and the rear fan. Therefore, the smooth outer side faces of the side plates alleviate the influence of the irregularities. Accordingly, the resistance of the air flow due to the front fan and the rear fan is reduced and the noise by the wind sound can be reduced. Furthermore, in fixing the side plates to the outer end portions of the blades of the front fan and the rear fan, since the end faces of the blades are flat, the heights thereof can easily be aligned by pressing or the like, and the positioning of the side plate in the circumferential direction becomes unnecessary thereby fixing the side plates to the end portions of the fans with high productivity.

Example 5

Figure 9:
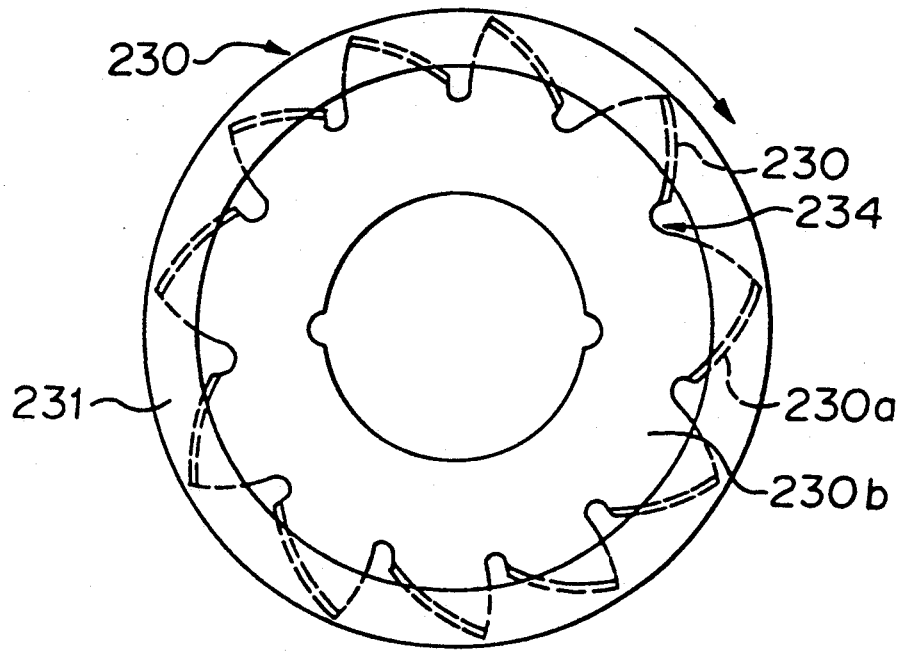
FIG. 9 is a front view showing an embodiment of a front fan for cooling by circulating air which is attached to a vehicular AC generator according to the present invention.
Figure 10:
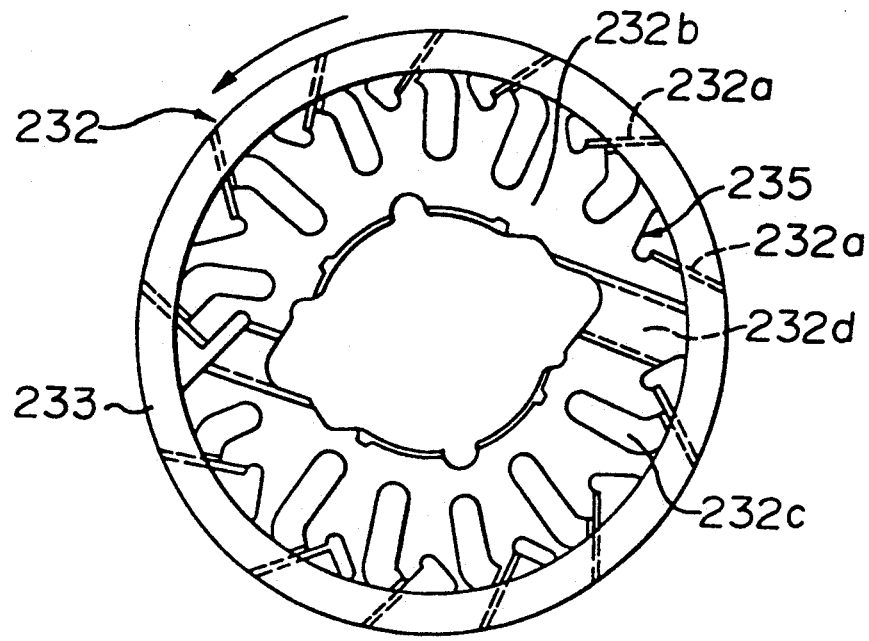
FIG. 10 is a front view showing an embodiment of a rear fan for cooling by circulating air, attached to a vehicular AC generator according to the present invention.

FIGS. 9 and 10 are respectively front views of the front fan 230 and the rear fan 232. As apparent in FIGS. 9 and 10, basically structures of the front fan 230 and the rear fan 232 are the same. These includes the main bodies of the fans 234 and 235 provided with a plurality of blades 230a and 232a attached to the peripheries of disc-like plates 230b and 232b orthogonal to the surfaces thereof and arranged in the peripheral direction thereof.

In the main bodies of the fans 234 and 235, ring-like side plates 231 and 233 are arranged at the outer edges on the side opposite to the plates 230b and 232b. The side plates are fixed to the edges of respective blades 230a and 232a by welding. In FIG. 10 showing the rear fan 232, a notation 232c designates a reinforcement rib attached to the plate 232b which is formed by pressing, and 232d, a protrusion for passing connecting lines of the excitation coil 7 on the back face side of the plate 232b. Such reinforcement rib 232c formed at the plate 232b of the rear fan 232, is preferably formed also at the plate 230b of the front fan 230.

Figure 11:
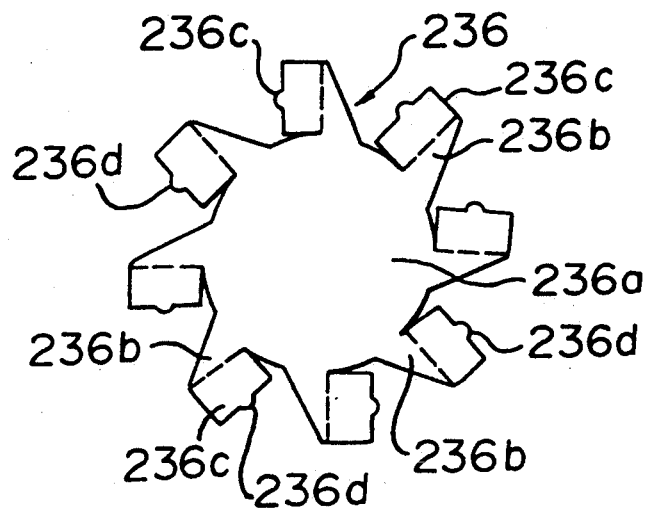
FIG. 11 is a front view showing a base plate punched out of a steel plate in forming a cooling fan for circulating air according to the present invention.

Next, explanation will be given to a method of making a cooling fan for circulating air in a vehicular AC generator. As explained before as the cooling fan for circulating air, the front fan 230 and the rear fan 232 are provided. However, for the convenience of explanation, explanation will be given to the case of making the front fan 230. First, as shown in FIG. 11, a star-shaped base plate 236 is punched out from a plate material such as a steel plate by pressing or the like. The base plate 236 is provided with triangular connecting portions 236b formed at equal intervals on the periphery of a disc portion 236a which is to be worked into the plate 230b.

A side of the triangular connecting portion 236b is connected to the periphery of the disc portion 236a. The other side thereof is extended outward from the periphery in the radial direction. A rectangular plate portion 236c is formed at the connecting portion 236b which extends in the circumferential direction and connects to a side thereof along the radial direction thereof. This rectangular plate portion 236c is to be formed into a blade. A projection for welding 236d utilized in a projection welding is formed at a pertinent place on a side of the rectangular plate portion on the side opposite to the side thereof connecting to the triangular connecting portion 236b.

Figure 12:
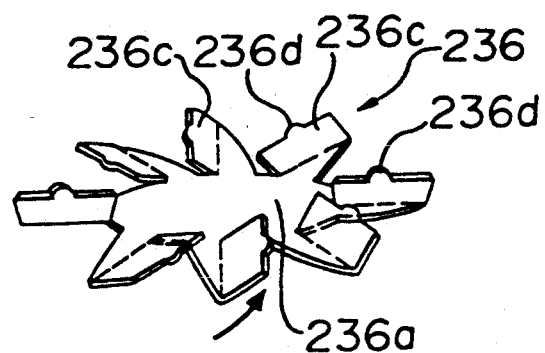
FIG. 12 is a perspective view of the base plate showing a state wherein a portion corresponding to formation of blades, of the base plate shown in FIG. 11, is formed by bending.
Figure 13:
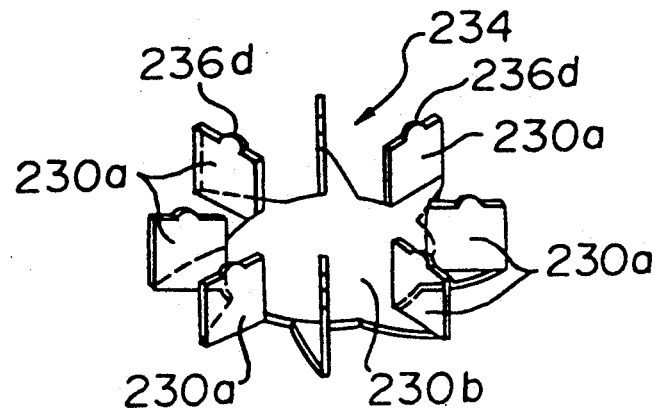
FIG. 13 is a perspective view showing a main body of a fan which is formed by working the base plate shown in FIG. 11.

Next, as shown in FIG. 12, the rectangular plate portion 236c is bent to the side of a surface of the disc portion 236a at the position of the side connecting to the triangular connecting portion 236b. As shown in FIG. 13, the rectangular plate portion 236c is approximately orthogonal to the surface of the disc portion 236a. In this way, the main body of the fan provided with the plurality of blades 230a standing on the surface of the plate 230b from the periphery thereof and arranged in the circumferential direction, is completed. The protrusion 236d for projection welding formed at each blade 230a is at the outer edge of the blade 230a opposite to the edge on the side of the disc portion 236a.

Figure 14:
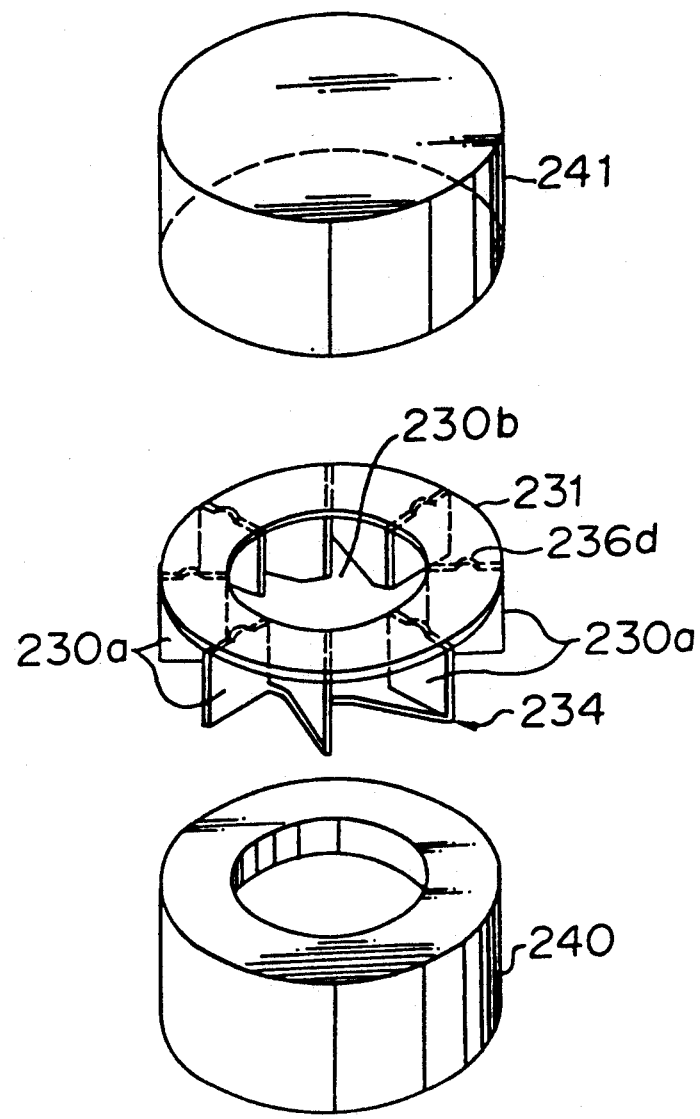
FIG. 14 is a perspective view showing an arrangement wherein a side plate is placed on the main body of the fan shown in FIG. 13 and a pair of electrodes is going to perform a projection welding from the top side and the bottom side.
Figure 15:
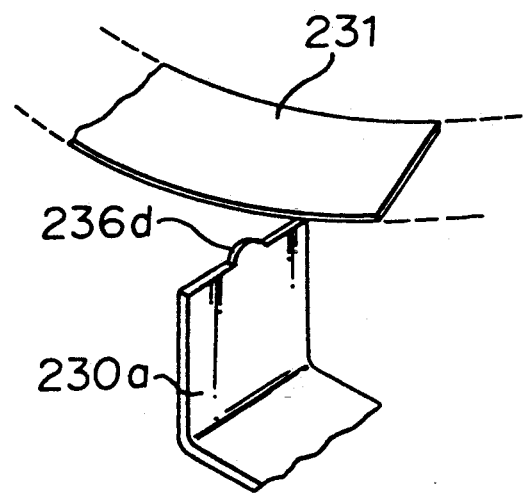
FIG. 15 is a perspective view showing in detail a positional relationship between the main body of the fan and the side plate shown in FIG. 14 by magnifying the corresponding portion.

The main body of the fan 234 which is formed in this way, is placed on an upper flat face of a ring-like integrated lower electrode 240 as shown in FIG. 14. The ring-like side plate 231 is placed on the outer edges of the respective blades 230a. At this moment, as shown in FIG. 15, the side plate 231 is substantially placed on the protrusions for a projection welding 236d formed at the outer edge portions of the respective blades 230a.

Thereafter, an upper electrode 241 is placed on the side plate 231. A current flows between the both electrodes 240 and 241, and at the same time the side plate 231 is pressed to the outer edges of the respective blades 230a by the two electrodes, by which the side plate 231 is projection-welded to the outer edges of the respective blades 230a.

Accordingly, by forming the protrusions for a projection welding 236d at outer edge portions of the respective blades 230a, the pressing positions wherein the respective blades 230a and the side plate 231 are pressed or press-contacted by the upper electrode 241 and the lower electrode 240, are equalized with respect to vertical planes of the blades 230a. The pressing action can effectively performed only by supporting the respective blades 230a from the side of the plate. As a result, as the lower electrode, the integrated one having a flat top shown in FIG. 14, can be utilized.

Figure 16:
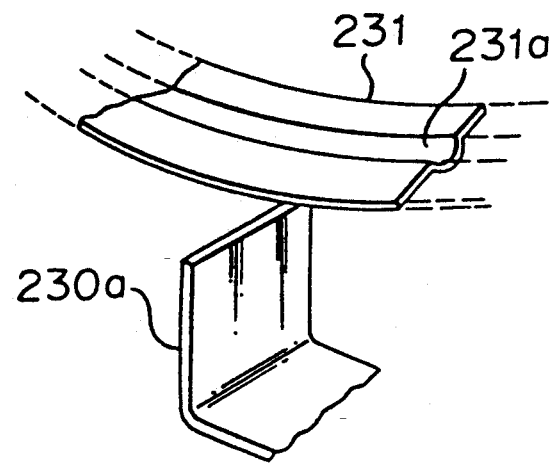
FIG. 16 is a perspective view similar to FIG. 14 showing in details by magnifying a portion of a cooling fan for circulating air according to another embodiment of the present invention.

Furthermore, in the method of making a cooling fan for circulating air in the above embodiment, the protrusion for projection welding 236d is formed at the outer edge portion of the respective blade 230a. However, as shown in FIG. 16, a protrusion 231a may be provided at the side plate 231 which protrudes from the surface of the side plate 231 contacting the blades along the contour of the side plate 231 in a ring-like shape and the outer edges of the respective blades 230a remain flat, with the similar effect.

Furthermore, in the above embodiment, the main body of the fan 234 is placed on the top flat face of the ring-like integrated electrode which is the lower electrode 240, and the side plate 231 is placed on the main body of the fan 234. On top of the assembly, the upper electrode 241 is placed and pressed. However, naturally, this ring-like integrated electrode can be utilized as the upper electrode.

As explained above, according to the cooling fan for circulating air in a vehicular AC generator of this invention, since the ring-like side plate is attached to the outer edge portions of the blades in the main body of the fan, the flat outer surface of the side plate alleviates the influence of the irregularities due to the inlet openings. Therefore, the resistance of the air flow by the cooling fan is reduced and the noise due to the wind sound can be reduced.

According to the method of making the cooling fan for circulating air in a vehicular AC generator of this invention, since the integrated electrode can be used as the lower electrode when the side plate and the respective blades are projection-welded, the positioning between the electrodes and the welding portions in the circumferential directions can be dispensed with thereby promoting the productivity. Furthermore, the generalized use of the electrodes is made possible and the service life of the electrode itself can be extended. Therefore, the economy thereof is promoted and the production or the repolishing of the electrodes can easily and accurately be performed. Therefore, a uniform welding can always be performed.

What is claimed is:

1. A vehicular AC generator, comprising:
   a stator supported by a front bracket and a rear bracket;
   a rotor fixed to a rotting shaft supported by the front bracket and the rear bracket through bearings, said rotor including magnetic pole cores having a plurality of pairs of magnetic pole teeth arranged in the circumferential direction of said rotor and retaining an excitation coil;

a pair of fans respectively provided at a front end and a rear end of the magnetic pole cores;

a plurality of inlet openings at end faces of the front bracket and the rear bracket; and a plurality of outlet openings provided at peripheral portions of the front bracket and the rear bracket, wherein said fans cool an inside of the vehicular AC generator by circulating air therein upon rotation of the rotor, wherein each of said fans includes a plurality of blades each having an end face and a side plate fixed to said end face of said blades and wherein a difference between an inner radius of each side plate and inner radius of the inlet opening of the corresponding front bracket is larger than a width of the corresponding blades, and the inner radius of each side plate is smaller than an outer radius of each corresponding inlet opening.

2. A vehicular AC generator, comprising:

a stator supported by a front bracket and a rear bracket;

a rotor fixed to a rotating shaft supported by the front bracket and the rear bracket through bearings, said rotor including magnetic pole cores having a plurality of pairs of magnetic pole teeth arranged in the circumferential direction of said rotor and retaining an excitation coil;

a pair of fans respectively provided at a front end and a rear end of the magnetic pole cores;

a plurality of inlet openings provided at end faces of the front bracket and the rear bracket; and a plurality of outlet openings provided at peripheral portions of the front bracket and the rear bracket, wherein said fans cool an inside of the vehicular AC generator by circulating air therein by rotation of the rotor, each of said fans including a plurality of blades protruding from said rotor and respectively having distal end faces and an annular side plate fixed to said distal end faces by welding, and wherein protrusions for said welding are provided on either one of said end faces of said blades and said side plate attached thereto.

3. A vehicular AC generator, comprising:

a stator supported by a front bracket and a rear bracket;

a rotor fixed to a rotating shaft supported by the front bracket and the rear bracket through bearings, said rotor including magnetic pole cores having a plurality of pairs of magnetic pole teeth arranged in the circumferential direction of said rotor and retaining an excitation coil;

a front fan and a rear fan provided at a front end and a rear end of the magnetic pole cores;

a plurality of inlet openings provided at end faces of the front bracket and the rear bracket; and a plurality of outlet openings provided at peripheral portions of the front bracket and the rear bracket, wherein said fans cool an inside of the vehicular AC generator by circulating air therein by rotation of the rotor, each of said fans including a plurality of blades protruding from said rotor and respectively having distal end faces, and an annular side plate fixed to each said distal end face by welding.

4. A cooling fan for circulating air in a vehicular AC generator which rotates with a rotor rotatably supported in brackets, sucks air from inlet openings formed in the brackets and exhausts air from outlet openings formed in the brackets thereby cooling an inside of the vehicular AC generator, said cooling fan comprising:

a plurality of blades arranged in the circumferential direction of the cooling fan and being supported by a base so as to protrude therefrom, said blades each having a distal end face opposite said base; and a ring-like side plate fixedly secured to said distal end face of each of said blades.

5. A method of making a cooling fan including a base plate and a plurality of circumferentially disposed blades protruding therefrom, said blades each having a distal end face opposite said base plate, wherein said fan circulates air in a vehicular AC generator which rotates with a rotor arranged in brackets, sucks air from inlet openings formed in the brackets and exhausts air from outlet openings formed in the brackets thereby cooling an inside of the vehicular AC generator, said method comprising the steps of:

providing at least a protrusion for welding between said distal end faces and a ring-like side plate disposed adjacent thereto;

placing a main body of the cooling fan including the base plate on a first electrode;

placing a side plate on said distal end faces of the plurality of blades of the main body;

placing a second electrode on said side plate; and flowing current between the first and the second electrodes and pressing the main body of the cooling fan and said side plate thereby welding the side plate to the end faces of the plurality of blades by a projection welding.

6. The method of claim 5, wherein said providing step comprises the step of forming protrusions on each of said distal end faces and holding said side plate against said protrusions.

7. The method of claim 5, wherein said providing step comprises the steps of forming a circular protrusion on said side plate and holding said protrusion against said distal end faces.

* * * * *